P. E. WIRT.
TIRE CONSTRUCTION.
APPLICATION FILED JAN. 13, 1909.
951,872.
Patented Mar. 15, 1910.
4 SHEETS—SHEET 1.
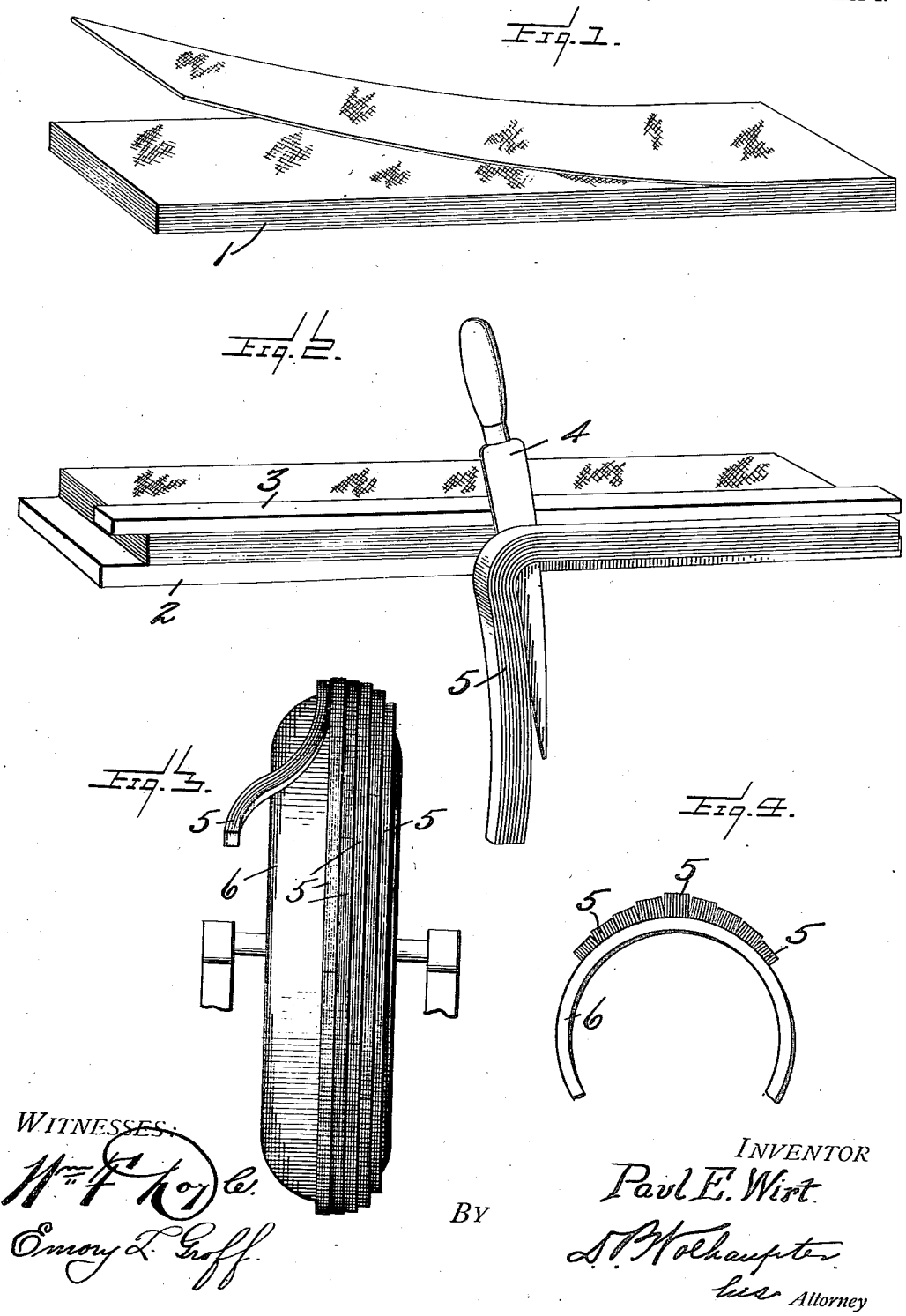

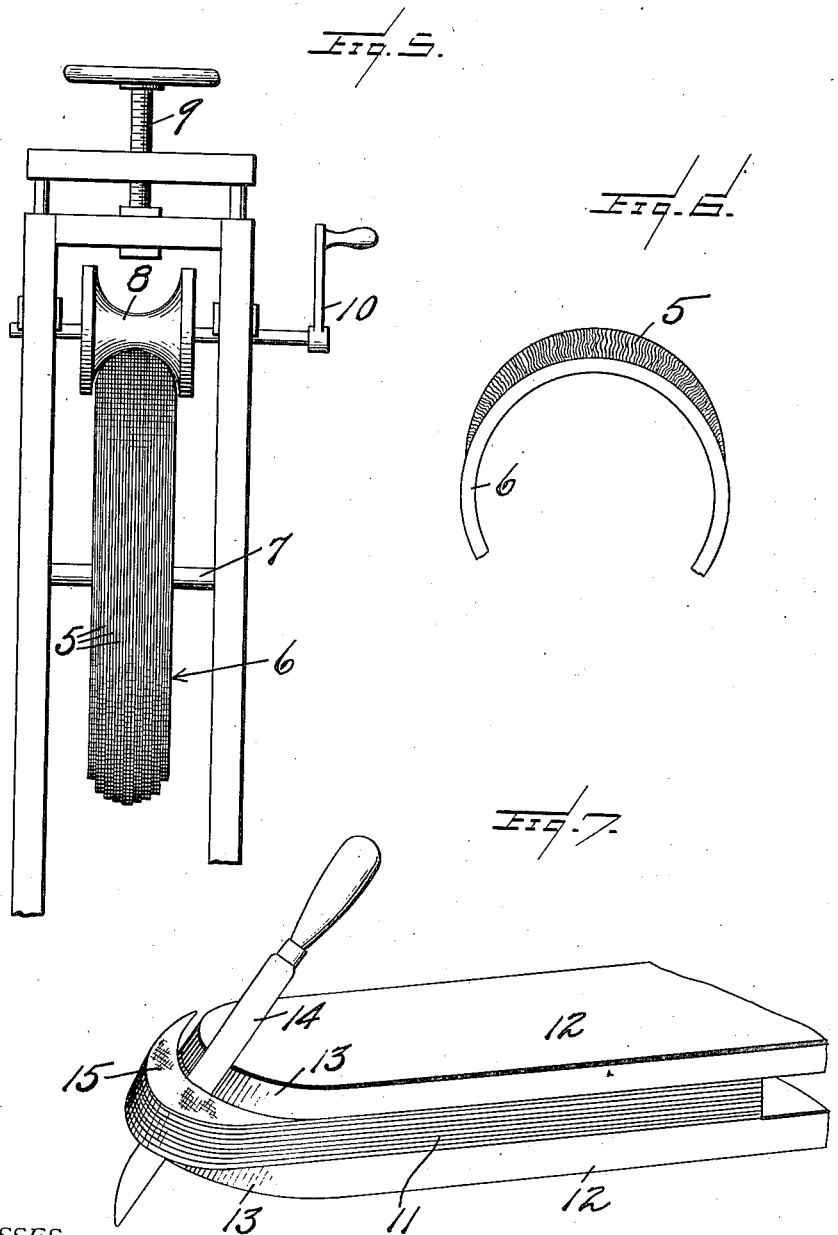

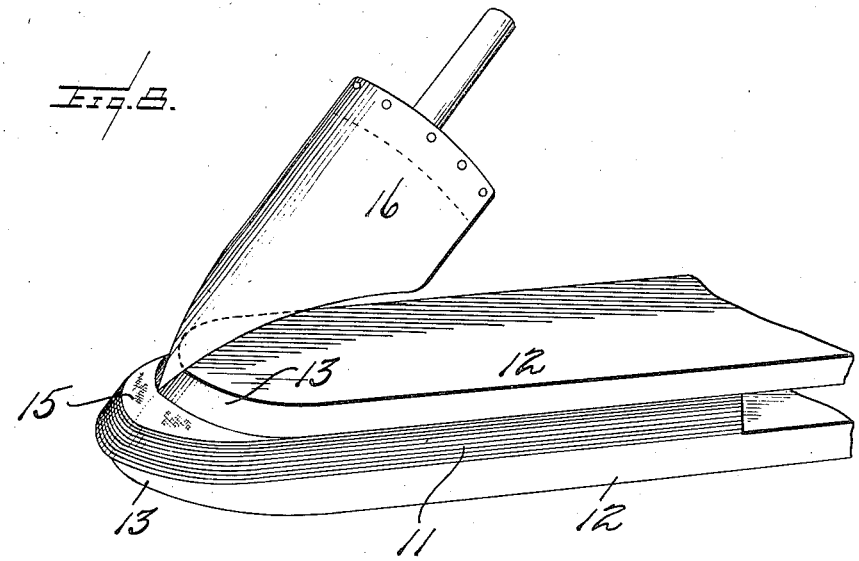
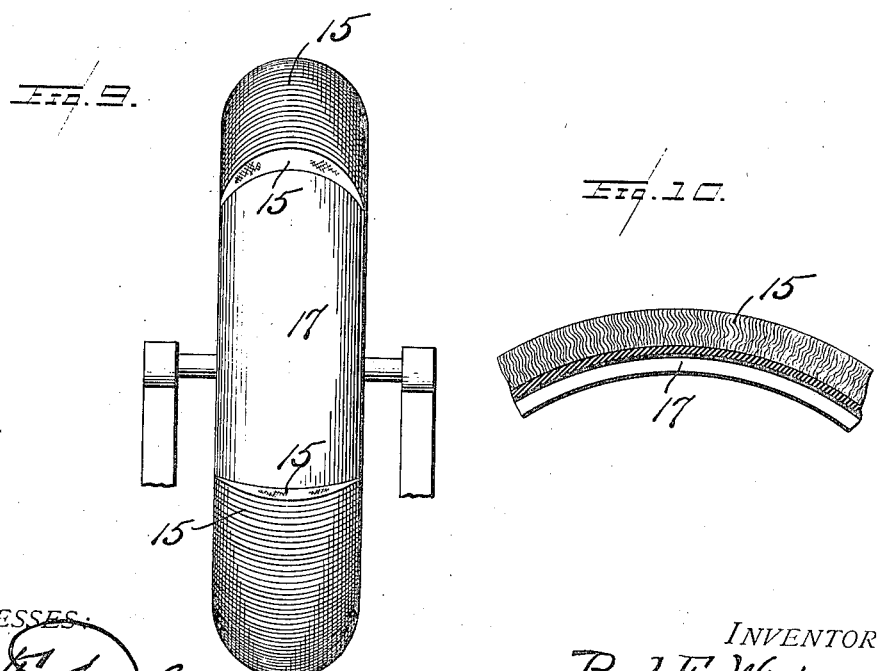

P. E. WIRT.
TIRE CONSTRUCTION.
APPLICATION FILED JAN. 13, 1909.
951,872.
Patented Mar. 15, 1910.
4 SHEETS—SHEET 4.
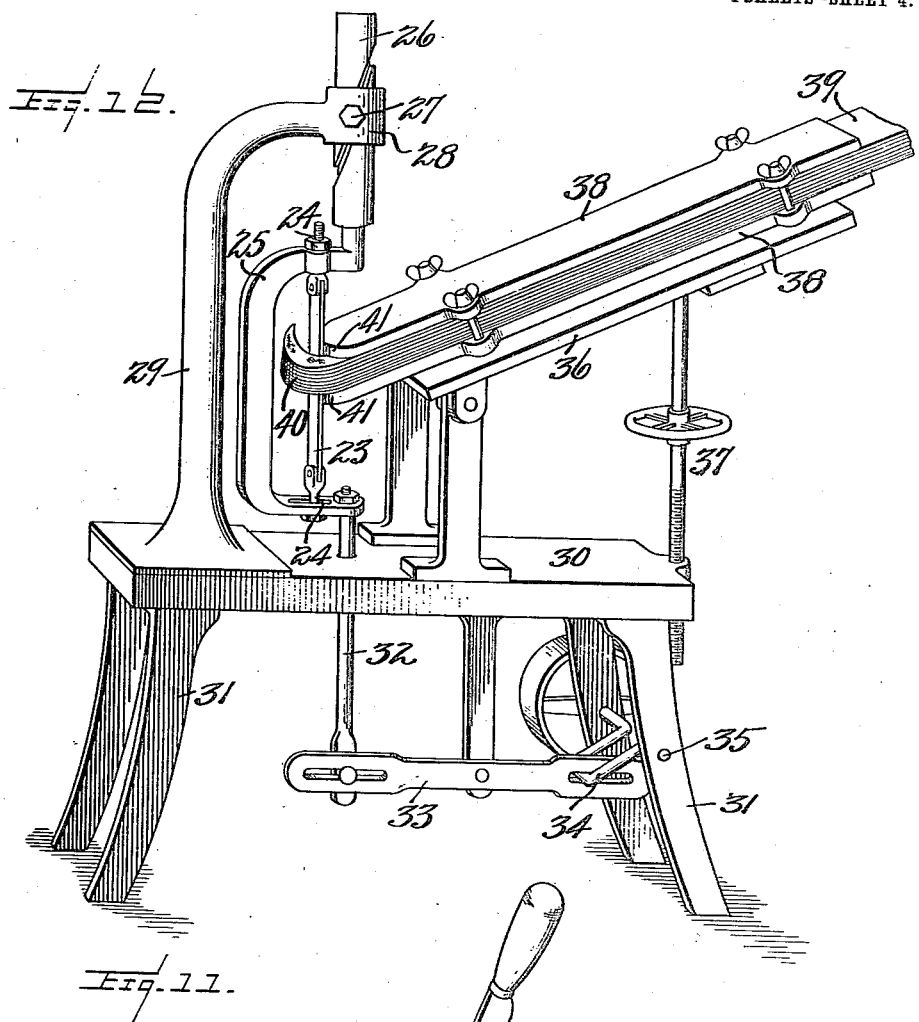
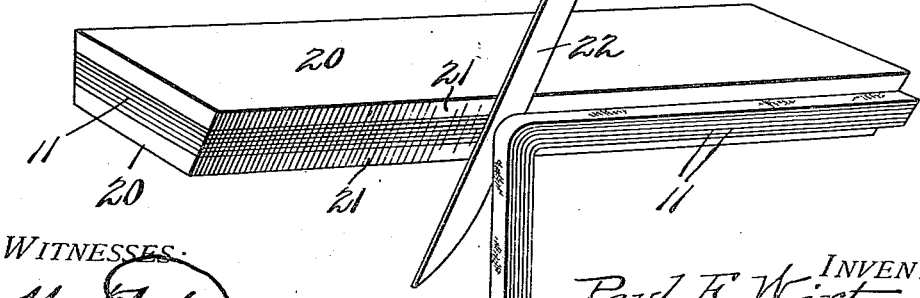
WITNESSES:
Wm F Koyle
Emory L Groff.
INVENTOR
Paul E. Wirt
BY
S. T. Wolhaupter,
his Attorney

UNITED STATES PATENT OFFICE.

PAUL ESTERLY WIRT, OF BLOOMSBURG, PENNSYLVANIA.

TIRE CONSTRUCTION.

951,872.   Specification of Letters Patent.   Patented Mar. 15, 1910.

Application filed January 13, 1909. Serial No. 472,127.

*To all whom it may concern:*

Be it known that I, PAUL E. WIRT, a citizen of the United States, residing at Bloomsburg, in the county of Columbia and State of Pennsylvania, have invented certain new and useful Improvements in Tire Construction, (Case E,) of which the following is a specification.

The present invention relates to a method or process of manufacturing pneumatic or analogous tires of a yielding character, and more particularly laminated tires of the character disclosed in co-pending applications.

The principal object of the present invention is to produce at comparatively slight expense, a tire of great resiliency, and at the same time, one peculiarly puncture-proof, and of great strength and toughness to withstand hard wear, rough usage, and the internal pressure and strain to which it is necessarily subjected.

A further object is to produce a laminated tire structure of separate forming-units so related and associated that the edges of the laminæ are presented at the crest or tread surface of the tire, the joints between said laminæ being broken and made irregular in order that an article which may enter the tire structure, cannot follow such joints, but must pass through a comparatively great number of the units, and said units, being composed of material that will offer great resistance to puncturing articles will practically preclude their entrance into the interior of the tire.

The accompanying drawings illustrate the various elements and parts of the tire at different steps in the production thereof, two slightly different articles produced by the method that is comprehended within the following claims being set forth, though it will be evident from said claims that said method is not limited solely to the production of said articles.

In the drawings: Figure 1 is a perspective view illustrating a pack of sheets, from which the forming-units are produced. Fig. 2 illustrates one manner of cutting the forming-unit blanks from such pack. Fig. 3 shows the application of said blanks to the tire body. Fig. 4 is a cross sectional view through the tire body showing the units in position. Fig. 5 illustrates one method that may be employed for crushing down the units. Fig. 6 is a cross sectional view of the tire as treated in Fig. 5, and illustrating the article resulting from the method. Fig. 7 is a view showing the manner of producing a different type of forming unit. Fig. 8 illustrates another manner of producing units of the character illustrated in Fig. 7, by employing a knife of crescent shape in cross section. Fig. 9 shows the application of said units to the tire body or case. Fig. 10 is a detail sectional view illustrating the modified form of tire structure complete. Fig. 11 is a perspective view illustrating an arrangement of parts to admit of the strips of forming units being cut at an angle by a suitable knife, and operated manually or otherwise. Fig. 12 is a general view in perspective illustrative of a form of power machine which may be utilized in cutting the crescent type of forming units.

Similar reference numerals designate corresponding parts in all the figures of the drawings.

In carrying out the method to produce one form of tire, a pack of sheets 1 is employed, these sheets being preferably rubberized fabric closely and adhesively compacted so as to insure the entire removal of the air from between them. The pack, as illustrated in Fig. 2 is placed upon a suitable support 2, and clamped by a guide 3. A knife 4 of any desired character severs successively from said pack sections 5 which are in effect forming-unit blanks. A body portion 6, having been produced in any suitable manner, such for instance as by the method described in a companion application filed January 13, 1909, Serial No. 472,128, the sections or unit blanks 5 are placed longitudinally thereupon, as shown in Fig. 3, producing a structure which in cross-section appears substantially as illustrated in Fig. 4. The tire is then rotatably mounted, as shown at 7 in Fig. 5, and a roller 8 is forced into compressing engagement with the periphery of the tire by any suitable means, as for instance a temper screw 9. This roller is provided with a concaved surface, the cross sectional contour of which is the reverse of that desired for the finished article. If now this roller 8 is revolved by any suitable means, as for instance, a handle crank 10, it will be evident that the units will be crushed inwardly, producing the structure shown in Fig. 6, in which the straight joints are broken and made irregular against the passage therethrough of an article which might puncture the tire.

For producing a slightly different form of tire, a pack 11 of rubberized sheets is secured between clamps 12, as shown in Fig. 7. The ends of these clamps are rounded as illustrated at 13 and disposed at an inclination, though they may be arranged perpendicularly to the pack. A knife 14 is employed which is guided by the rounded ends 13, and thus produces sets of crescent-shaped forming units 15. Instead of the straight form of hand-knife shown in Fig. 7 of the drawings, there may be utilized, for cutting the crescent type of units, a reciprocatory knife 16 of a crescent shape in cross section, and which may be reciprocated either by hand or power over the rounded beveled ends 13 of the clamps between which the pack of rubberized sheets is secured. This form of apparatus, embodying the crescent shaped knife 16 is suggested by the illustration of Fig. 8 of the drawings. These units are placed side by side in closely compacted relation upon, and transversely of, a tire body 17, shown in Fig. 9, after which they are crushed inwardly, producing unequal joints as illustrated in Fig. 10. After the production of the article, shown in Figs. 6 and 10, the tread portion can be covered with soft rubber, and the entire tire vulcanized in the ordinary manner.

While the method is peculiarly useful in producing the tread portions of tires, in its broadest aspect, it is not limited thereto, but may be employed in constructing the body portion or any other portion of a tire, and it is intended that the claims be so interpreted.

In connection with this method of producing tires, it will be evident that while the structure is built up of single thicknesses of rubberized fabric, to handle each piece in single thickness and build it into a continuous tread such as I show herein, would not be at all feasible, but to prepare tread material in body or bulk of any desired thickness to be cut into longitudinal strips or into crescent-shaped sections, makes it possible to build up the tread with greater rapidity, more certainty and ease. Another very desirable end accomplished by forming the material in the manner shown is that it may be laid or piled up in bulk and so rolled or pressed that all air between laminations is forced out from between the single thicknesses. If each single thickness or lamination in my tire were handled separately and built into place, there would of necessity be less compactness between leaves and greater risk would be run in having air, which is very detrimental to vulcanizing, trapped at different places between the leaves. They could not be packed so nicely nor so regularly. As stated, when there is some body or bulk to handle in making up the tread in sections, it is accomplished more rapidly, more regularly, and, above all, with more certainty as to results, in vulcanizing and in covering with the outer rubber covering.

By way of further exemplifying the invention, there is suggested in Fig. 11 of the drawings a plan of placing the pack 11 of rubberized sheets between clamps or table plates 20 provided with correspondingly beveled edge portions 21 constituting a beveled guide for the edge of the cutting knife 22, and thus providing means whereby the strips of forming units may be cut at an angle for utilization in the manner suggested in my co-pending applications for patents. In employing an apparatus of this character, that is as shown in Fig. 11 of the drawings, it will of course be understood that the cutting knife employed may be either a hand or power operated knife without in any way affecting the essentials of the process forming the subject matter of this application. In further explanation of the distinguishing features underlying the present invention, to provide for building up a tire structure of closely compacted individual cut forming units, presenting their edges to the tread or wearing surface of the tire, it may be noted that as to the means or manner of cutting both crescent shaped and strip-like forming units, the crescent shaped units may be very desirably prepared or cut by means of any suitable power mechanism or apparatus, such for instance as the machine illustrated in Fig. 12 of the drawings. This machine is shown for illustrative purposes to exemplify the use of a complete power mechanism for cutting the strips of forming units, and in the form of machine selected for illustration in Fig. 12 of the drawings, the same involves in its general organization a vertically moving straight flat cutter blade designated by the reference number 23, adjustably mounted, as at 24, within and upon a yoke shaped knife frame 25 united at its upper end with a spirally grooved turning plunger 26 coöperating with a set screw 27 fitted to a bearing or bearing collar 28 at the upper end of a supporting standard 29 mounted upon the machine platform 30 preferably supported upon the leg standards 31. The lower end of the said knife frame 25 is illustrated as having a connection with the upper end of a reciprocal rod 32 operatively connected with one end of an oscillating beam 33, the other end of which is connected with, and operated from, a crank 34 on the main operating shaft 35 which is suitably belted to the power. The machine also is shown as embodying in its organization a work supporting table 36 which may be raised or lowered to the proper inclination through the medium of a raising and lowering device 37, and upon said table is supported, in any suitable manner, the clamp 38—38 between which is held the pack of rubberized sheets 39 from which the crescent shaped forming units 40 are to cut off at the rounded ends 41 of the clamp members 38—38. These are the principal and general parts of the suggested type of power machine shown in Fig. 12 of the drawings, and have been sufficiently indicated to show how the strips may be cut by power in an expeditious and practical manner.

It will be obvious from the construction of machine described, that the blade 23 may be set in such a position that when in its up and down motion it describes a semi-circle or crescent. Also, any desired size of semi-circle may be described by the edge of the blade, according to the adjustment thereof, and in arranging the material, the end of the pack or piece of tread material in proper width to make the desired size crescent section, is placed upon the table, and fed by suitable means to gage against the blade. The edge of the blade, in its operations, circles closely about or against the rounded end of the clamp wherein the material is held and fed to the blade, so that when the material is fed to gage under the descending cutter, the desired crescent sections are successively cut from the end of the pack or slab of tread material.

It will be understood that the flat straight blade being held in an upright or vertical position on the moving frame cuts or swings in a partial circle as it descends, and in its upward movement so retires to begin over the cutting or a new semi-circle. The gaging or holding of tread material to the blade is, as stated, done upon a small flat holding table and clamp, the end of which is rounded to form to the semi-circle described by the edge of the moving blade. The table with its clamps is adjustably constructed as explained so as to present the tread material to the blade at any angle or pitch. By this means sections may be cut at right angles to the tread material, or the table may be pitched to cut tread material at any desired bevel or angle. These operations may of course be secured through the medium of any suitable mechanical expedients, that is the feeding of the pack or slab of material to gage, and the movement of the cutter in time therewith, but in any form of apparatus for accomplishing this result, it is necessary to firmly clamp the material at the cutting blades in order that clean cut units may be obtained. As to the cutting of forming unit material into straight strips, there is, of course, less difficulty, as other simple appliances may be utilized for that purpose, such as suggested in Fig. 2 of the drawings.

In relation to the fundamental ideas underlying the invention, it is to be remembered that the built-up tire or tread material is of such yielding or molding consistency, owing to its composition when in rubber and fabric, that it conforms readily under pressure to any desired shape within limits. It will also be remembered, that in building up tires in the usual way the rubbered fabric, owing to the nature of the unvulcanized soft rubber upon the surfaces that it is desired to contact, such contacted surfaces immediately stick, cling or adhere together. Therefore, in building up my tread, whether in strips or crescent-shaped sections, the contacted surfaces immediately amalgamate and readily and easily permit manipulation into form and position. Therefore, in constructing my tread upon the wearing face of which are corrugations, studs or bosses, or with a flat face, all of which prevent skidding, it is not a difficult matter to compress the face of the tread into any desired shape for the purpose intended. In all this work, however, I would again call attention to the fact that in the building-up, rolling or pressing the air must be eliminated from between the joints.

I claim:

1. A method of constructing tires which consists in building-up on the external surface of the tire body a separate tread structure by successively laying tread forming units, of flexible sheet material, on edge and in tightly compacted face to face relation with their outer edges presented toward the wearing surface, and finally vulcanizing the whole.

2. A method of constructing tires which consists in cutting from flexible sheet-material a plurality of similar tread forming units, then laying said units on edge upon a tire body in tightly compacted face to face relation, covering such built-up structure with a rubber covering, and finally vulcanizing the whole.

3. A method of constructing tires which consists in forming a tire body, cutting from flexible sheet-material a plurality of similar tread forming units, then laying said units on edge upon the body to form a separate tread tapering in thickness to the sides of the tire body, said units being arranged in tightly compacted face to face relation with their outer edges presented toward the wearing surface.

4. A method of constructing tires, which consists in preparing a pack of material made up of sheets of fabric adhesively compacted, then cutting from said pack of material similar tread forming sections, then laying-up said sections on edge upon a body to present the outer edges of all of the sheets toward the wearing surface, and finally vulcanizing the whole.

5. A method of constructing tires which consists in forming a tire body, preparing a pack of material made up of sheets of fabric adhesively and tightly compacted, then cutting from said pack of material similar tread forming sections, then laying said sections on edge upon the tire body to present their outer edges toward the wearing surface, said sections being laid up on the body successively in face to face contact, and finally vulcanizing the whole.

6. The method of constructing tires, which consists in associating a plurality of tire forming units and crushing said units to break and make irregular the joints between them.

7. The method of constructing tires, which consists in placing side by side a plurality of tire forming units and crushing said units edgewise to break and make irregular the joints between them.

8. The method of constructing tires, which consists in forming a tire body, placing thereupon side by side a plurality of flexible forming units with outstanding edges and forcing said edges inwardly to crush the units and break up and make irregular the joints between them.

9. The method of constructing tires, which consists in placing side by side a plurality of tire forming units of rubberized fabric and crushing said units edgewise to break and make irregular the joints between them.

10. The method of constructing tires, which consists in forming a tire body, placing longitudinally thereupon and side by side a series of forming units and crushing said units to break up and make irregular the joints between them.

11. The method of constructing tires, which consists in forming a tire body, cutting a plurality of strips of predetermined length into forming units, placing said units longitudinally upon the tire body and side by side in closely compacted relation and crushing said units edgewise to break up and make irregular the joints between them.

12. The method of constructing tires, which consists in forming a tire body, securing together a plurality of layers of rubberized fabric, cutting from said secured layers a plurality of sets of forming units, securing said sets longitudinally upon the body side by side, and crushing down edgewise certain of said units to break the joints between them and make said joints irregular.

In testimony whereof I hereunto affix my signature in the presence of two witnesses.

PAUL ESTERLY WIRT.

Witnesses:
KARL F. WIRT,
R. L. ORANGE.